United States Patent
Nimbalker et al.

(10) Patent No.: US 12,101,766 B2
(45) Date of Patent: Sep. 24, 2024

(54) CONTROL OF DRX USING LAYER-1 SIGNALING

(71) Applicant: Telefonaktiebolaget LM Ericsson (publ), Stockholm (SE)

(72) Inventors: Ajit Nimbalker, Fremont, CA (US); Ravikiran Nory, San Jose, CA (US); Yutao Sui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 576 days.

(21) Appl. No.: 17/278,878

(22) PCT Filed: Sep. 24, 2019

(86) PCT No.: PCT/EP2019/075667
§ 371 (c)(1),
(2) Date: Mar. 23, 2021

(87) PCT Pub. No.: WO2020/064710
PCT Pub. Date: Apr. 2, 2020

(65) Prior Publication Data
US 2022/0053529 A1 Feb. 17, 2022

Related U.S. Application Data

(60) Provisional application No. 62/735,298, filed on Sep. 24, 2018.

(51) Int. Cl.
*H04W 72/12* (2023.01)
*H04L 1/18* (2023.01)
(Continued)

(52) U.S. Cl.
CPC ....... *H04W 72/1273* (2013.01); *H04L 1/1819* (2013.01); *H04L 5/0053* (2013.01); *H04W 72/23* (2023.01); *H04W 76/28* (2018.02)

(58) Field of Classification Search
CPC . H04W 72/1273; H04W 76/28; H04W 72/23; H04L 1/1819; H04L 5/0053
See application file for complete search history.

(56) References Cited

U.S. PATENT DOCUMENTS

2006/0034285 A1   2/2006   Pirskanen et al.
2006/0056355 A1   3/2006   Love et al.
(Continued)

FOREIGN PATENT DOCUMENTS

AU   2017436886 A1   5/2020
CO   06122135        11/2007
(Continued)

OTHER PUBLICATIONS

Ericsson, "Power Consumption Reduction for Paging and Connected-Mode DRX for NB-IoT", 3GPP TSG-RAN WG1 Meeting #90, Prague, Czech Republic, Aug. 21, 2017, pp. 1-9, R1-1712621, 3GPP.

(Continued)

*Primary Examiner* — Derrick V Rose
(74) *Attorney, Agent, or Firm* — COATS & BENNETT, PLLC

(57) ABSTRACT

Techniques are provided for fast adaptation of DRX settings used by a UE via L1 signaling in order to reduce power consumption by the UE. Generally, the UE is configured for DRX by a higher layer protocol (e.g. RRC), and L1 signaling can be used to control or adapt the DRX by the UE. For example, the L1 signaling may be used to adjust or override 5 operation of an IAT. The downlink control information may be sent in an existing downlink control message or in a new downlink control message. The downlink control message may be a scheduling message scheduling a data transmission to or from the UE.

20 Claims, 19 Drawing Sheets

(51) Int. Cl.
*H04L 1/1812* (2023.01)
*H04L 5/00* (2006.01)
*H04W 72/1273* (2023.01)
*H04W 72/23* (2023.01)
*H04W 76/28* (2018.01)

(56) References Cited

U.S. PATENT DOCUMENTS

| | | | |
|---|---|---|---|
| 2007/0106924 A1 | 5/2007 | Seidel et al. | |
| 2008/0095116 A1 | 4/2008 | Kim et al. | |
| 2012/0106510 A1 | 5/2012 | Kuo | |
| 2012/0275364 A1 | 11/2012 | Anderson et al. | |
| 2014/0050186 A1 | 2/2014 | Kim et al. | |
| 2015/0085720 A1 | 3/2015 | Gaal et al. | |
| 2015/0230173 A1 | 8/2015 | Li et al. | |
| 2016/0119948 A1 | 4/2016 | Damnjanovic et al. | |
| 2016/0330659 A1 | 11/2016 | Zhu et al. | |
| 2017/0142700 A1 | 5/2017 | Pan et al. | |
| 2018/0020365 A1 | 1/2018 | Xiong et al. | |
| 2018/0077722 A1 | 3/2018 | Awad et al. | |
| 2018/0145800 A1 | 5/2018 | Srivastav et al. | |
| 2018/0242319 A1 | 8/2018 | Akkarakaran et al. | |
| 2019/0098689 A1* | 3/2019 | Wei | H04W 72/23 |
| 2019/0312635 A1 | 10/2019 | Ang et al. | |
| 2020/0037245 A1 | 1/2020 | Lu et al. | |
| 2020/0052830 A1 | 2/2020 | Liu et al. | |
| 2020/0053755 A1 | 2/2020 | Ang et al. | |
| 2020/0077432 A1 | 3/2020 | Xiong et al. | |
| 2020/0107345 A1 | 4/2020 | Ang et al. | |
| 2020/0288479 A1 | 9/2020 | Xi et al. | |
| 2020/0359361 A1 | 11/2020 | Takeda et al. | |
| 2021/0076445 A1 | 3/2021 | Tsai et al. | |
| 2021/0219328 A1 | 7/2021 | Xiong et al. | |
| 2021/0259044 A1* | 8/2021 | Islam | H04W 72/535 |
| 2021/0306824 A1 | 9/2021 | Li et al. | |
| 2021/0314866 A1 | 10/2021 | Lee et al. | |
| 2021/0360674 A1* | 11/2021 | Lim | H04L 5/0098 |
| 2021/0400699 A1 | 12/2021 | Nory et al. | |
| 2022/0039009 A1 | 2/2022 | Iyer et al. | |
| 2022/0053540 A1 | 2/2022 | Takeda et al. | |
| 2022/0104122 A1 | 3/2022 | Maleki et al. | |
| 2022/0159700 A1 | 5/2022 | Maleki et al. | |
| 2022/0346068 A1 | 10/2022 | Nimbalker et al. | |
| 2023/0097818 A1 | 3/2023 | Maleki et al. | |

FOREIGN PATENT DOCUMENTS

| | | |
|---|---|---|
| WO | 2017218749 A1 | 12/2017 |
| WO | 2018133754 A1 | 7/2018 |
| WO | 2020064770 A1 | 4/2020 |
| WO | 2020065624 A1 | 4/2020 |

OTHER PUBLICATIONS

Huawei, et al., "Design Considerations for UE Power Saving", 3GPP TSG RAN WG1 Meeting #93, Busan, Korea, May 21, 2018, pp. 1-4, R1-1807306, 3GPP.

Intel Corporation, "Dynamic C-DRX Configuration in NR", 3GPP TSG RAN WG2 Meeting #97, Athens, Greece, Feb. 13, 2017, pp. 1-3, R2-1701722, 3GPP.

Catt, "NR DRX Design", 3GPP TSG-RAN WG2 Meeting #97, Athens, Greece, Feb. 13, 2017, pp. 1-4, R2-1700972, 3GPP.

Qualcomm Incorporated, "Discussion on DCI Related Issues", 3GPP TSG RAN WG1 Meeting #92, Athens, Greece, Feb. 26, 2018, pp. 1-4, R1-1802836, 3GPP.

Vivo, "NR UE Power Saving", 3GPP TSG RAN WG1 Meeting #93, Busan, Korea, May 21, 2018, pp. 1-5, R1-1806091, 3GPP.

Qualcomm Incorporated, "Views on UE Power Saving", 3GPP TSG RAN WG1 Meeting #94, Gothenburg, Sweden, Aug. 20, 2018, pp. 1-11, R1-1809462, 3GPP.

Samsung, "On UE Power Savings", 3GPP TSG RAN WG1 Meeting #92, Athens, Greece, Feb. 26, 2018, pp. 1-5, R1-1801977, 3GPP.

Qualcomm Incorporated, "Remaining Issues on DL/UL Resource Allocation", TSG-RAN WG1 Meeting #93, Busan, Korea, May 21-25, 2018, pp. 1-16, R1-1807652, 3GPP.

Qualcomm Incorporated, "UE Power Saving during Active State", TSG RAN WG2 NR #99bis, Prague, Czech, Oct. 9-13, 2017, pp. 1-8, R2-1711904, 3GPP.

Ericsson: "Adaptation aspects of NR UE power saving", TSG-RAN WG1 Meeting AH-1901, Taipei, Taiwan, Jan. 21-25, 2019, pp. 1-8, Tdoc R1-1901166, 3GPP.

Qualcomm Incorporated, "Remaining Issues on DL/UL Resource Allocation", 3GPP TSG-RAN WG1 Meeting #93, Busan, Korea, May 21-25, 2018, pp. 1-14, R1-1807363, 3GPP.

* cited by examiner

CONTROL OF DRX USING LAYER-1 SIGNALING

TECHNICAL FIELD

The present disclosure relates generally to power saving techniques for wireless devices in wireless communication networks and, more particularly, to control of discontinuous reception (DRX) settings using layer 1 (L1) signaling.

BACKGROUND

Each of these services has different technical requirements. For example, the general requirement for eMBB is high data rate with moderate latency and moderate coverage, while URLLC service requires low latency and high reliability transmission with moderate data rates.

One of the solutions for providing low latency data transmission is shorter transmission time intervals. In NR, in addition to transmission in a slot, a mini-slot transmission is also allowed to reduce latency. A mini-slot may consist of any number of 1 to 14 Orthogonal Frequency Division Multiplexing (OFDM) symbols. It should be noted that the concepts of slot and mini-slot are not specific to a specific service meaning that a mini-slot may be used for either eMBB, URLLC, or other services.

Power consumption of user equipment (UE) is an important design consideration for NR systems. A UE can expend significant power monitoring the Physical Downlink Control Channel (PDCCH) to determine whether a DL transmission for the UE is scheduled. The UE needs to perform blind detection in its configured Control Resource Sets (CORE-SETs) to identify whether the DL control information (DCI) transmitted on the PDCCH is addressed to the UE and act accordingly. Techniques that reduce unnecessary PDCCH monitoring or allow UE to sleep and wake-up only when required can be beneficial from a power consumption perspective.

Discontinuous reception (DRX) is a one technique for conserving power. DRX allows UE to transition to lower power state or "sleep mode" when it is not required to receive DL transmissions and to wake up periodically to monitor a paging channel or DL control channel for scheduling information. A "wake up signal" (WUS) has been proposed for idle mode in LTE-M and NB-IOT. The proposed WUS for LTE-M and NB-IOT is not suited for a NR UE operating in connected mode, as the design, processing times, channel/signal structure, power consumptions model, reliability requirement/mobility requirements, etc., are different. During the study of LTE-M and NB-IoT, another type of precursor signal called a go-to-sleep (GTS) signal was also proposed. In this proposal, the UE enters the sleep mode or low power mode responsive to the detection of the GTS signal. The UE remains "awake" until the GTS signal is detected. One drawback of the GTS signal is power consumption of the base station, as the GTS signal needs to be always sent for the UE to go back to sleep. In a system with a very low paging rate, such signal needs to appear often, which is not desirable from an overhead point of view.

SUMMARY

The present disclosure provides techniques for fast adaptation of DRX settings used by a UE via L1 signaling in order to reduce power consumption by the UE. Generally, the UE is configured for DRX by a higher layer protocol (e.g. RRC), and L1 signaling can be used to control or adapt the DRX by the UE. For example, the L1 signaling may be used to adjust or override operation of an IAT. The downlink control information may be sent in an existing downlink control message or in a new downlink control message. The downlink control message may be a scheduling message scheduling a data transmission to or from the UE.

A first aspect of the disclosure comprises a UE configured for fast adaptation of DRX settings. The UE receives configuration information from a base station or network node for configuring discontinuous reception (DRX) by the UE. The UE further receives downlink control information from the base station via L1 signaling. The UE controls or adapts DRX by the UE responsive to the downlink control information from the base station.

A second aspect of the disclosure comprises methods implemented by a base station to support fast adaptation of a DRX configuration for a UE. In one embodiment of the method, the base station sends configuration information to a UE to configure DRX by the UE. The base station further sends downlink control information to the UE via layer 1 (L1) signaling to control or adapt DRX by the UE.

A third aspect of the disclosure comprises a UE configured for fast adaptation of a DRX configuration operative to configure a DRX configuration for a UE. The UE is configured to receive configuration information from a base station or network node for configuring discontinuous reception (DRX) by the UE. The UE is further configured to receive downlink control information from the base station via L1 signaling and to control or adapt DRX by the UE responsive to the downlink control information from the base station.

A fourth aspect of the disclosure comprises a base station operative to support fast adaptation of a DRX configuration for a UE. The base station is configured to send configuration information to a UE to configure DRX by the UE. The base station is further configured to send downlink control information to the UE via layer 1 (L1) signaling to control or adapt DRX by the UE.

A fifth aspect of the disclosure comprises a UE configured for fast adaptation of a DRX configuration. The UE comprises interface circuitry for communicating over a wireless channel with a UE and a processing circuit. The processing circuit is configured to receive configuration information from a base station or network node for configuring discontinuous reception (DRX) by the UE. The processing circuit is further configured to receive downlink control information from the base station via L1 signaling and to control or adapt DRX by the UE responsive to the downlink control information from the base station.

A sixth aspect of the disclosure comprises a base station operative to support fast adaptation of a DRX configuration for a UE. The base station comprises interface circuitry for communicating over a wireless channel with a UE and a processing circuit. The processing circuit is configured to send configuration information to a UE to configure DRX by the UE. The processing circuit is further configured to send downlink control information to the UE via layer 1 (L1) signaling to control or adapt DRX by the UE.

A seventh aspect of the disclosure comprises a computer program product comprising executable instructions that configure a processing circuit in a UE to perform the method according to the first aspect. The computer program product can be embodied in a carrier, such as an electronic signal, optical signal, radio signal, or computer readable storage medium.

An eighth aspect of the disclosure comprises a computer program product comprising executable instructions that configure a processing circuit in a base station to perform the method according to the second aspect. The computer program product can be embodied in a carrier, such as an electronic signal, optical signal, radio signal, or computer readable storage medium.

DETAILED DESCRIPTION

Figure 1:
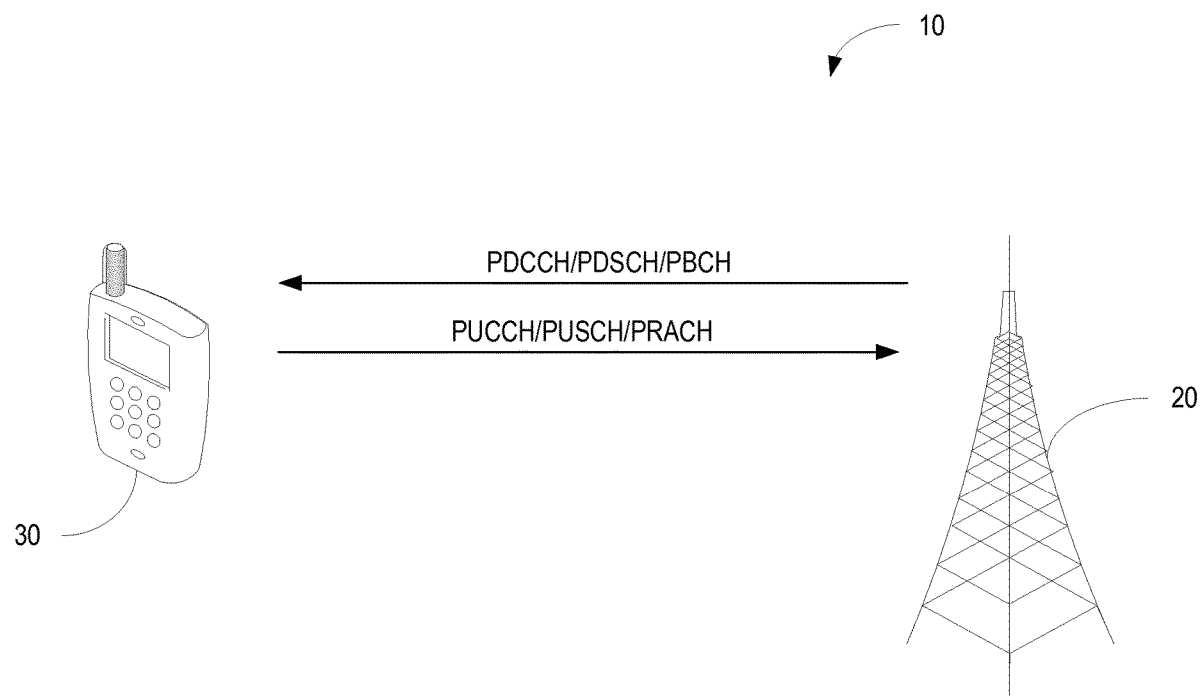
FIG. 1 illustrates an exemplary communication network according to an embodiment.

Referring now to the drawings, an exemplary embodiment of the present disclosure will be described in the context of Fifth Generation (5G) and Next Radio (NR) communication network configured for eMBB, URLLC, and MTC. The power saving techniques herein described can be easily adapted by those skilled in the art for use in communication networks based on other radio access technologies (RATs), such as Long Term Evolution (LTE) networks, Wideband Code Division Multiple Access (WCDMA) networks, Code Division Multiple Access (CDMA) 2000 networks, Wireless Fidelity (WiFi) networks, Worldwide Interoperability for Microwave Access (WiMAX) networks, Wireless Local Area Networks (LANs) (WLANs), Narrowband Internet of Things (NB-IoT) networks, or other wireless communication networks.

FIG. 1 illustrates communications between a base station 20 in a wireless communication network 10 and a user equipment (UE) 30. The base station 20 is sometimes referred to in applicable standards as an Evolved Node B (eNB) or 5G Node B (gNB). The UE 30, also referred to as a wireless device or wireless terminal, may comprise a cellular telephone, smart phone, laptop computer, notebook computer, tablet, machine-to-machine (M2M) communication devices (also referred to as machine-type communication (MTC) devices), or other devices with wireless communication capabilities.

Figure 2:
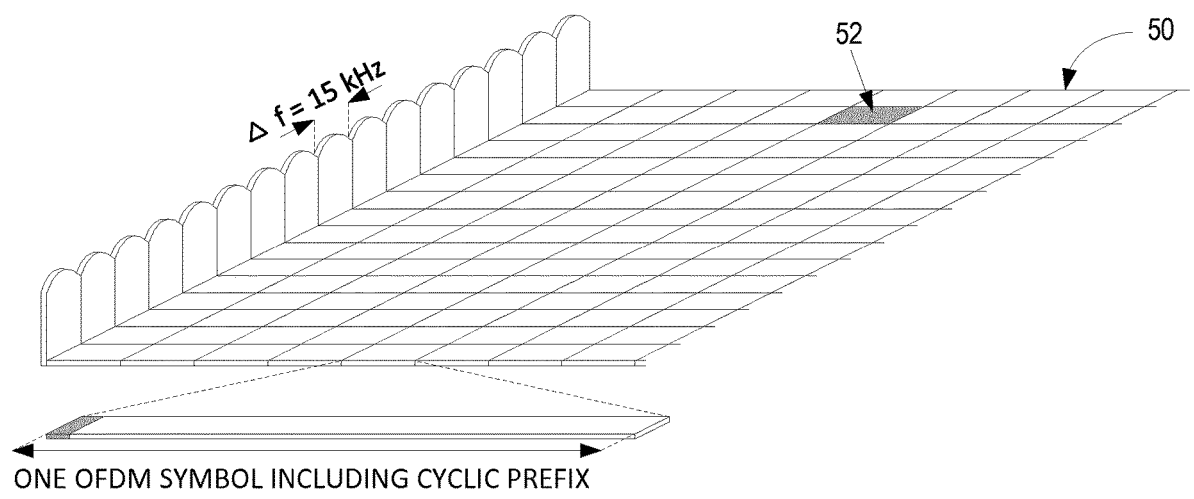
FIG. 2 is a time-frequency grid representing the physical resources for data transmissions.

The radio resources in NR can be viewed as a time-frequency grid 50 as shown in FIG. 2. In the time domain, the physical resources are divided into subframes. Each subframe includes a number of symbols. For a normal Cyclic Prefix (CP) length, suitable for use in situations where multipath dispersion is not expected to be extremely severe, a subframe comprises fourteen symbols. A subframe comprises twelve symbols if an extended CP is used. In the frequency domain, the physical resources are divided into subcarriers. The number of subcarriers varies according to the allocated system bandwidth. A subframe typically comprises two time slots, which may be further subdivided into mini-slots. A mini-slot comprises one or more symbol periods in a time slot. The smallest element of the time-frequency grid 50 is a resource element (RE) 52, which comprises the intersection of one subcarrier and one symbol.

The Third Generation Partnership Project (3GPP) is defining technical specifications for New Radio (NR) (e.g., 5G). In release 15 (Rel-15) NR, a UE 30 can be configured with up to four carrier bandwidth parts (BWPs) in the DL with a single DL carrier BWP being active at a given time. A UE 30 can be configured with up to four carrier BWPs in the UL with a single UL carrier BWP being active at a given time. If a UE 30 is configured with a supplementary UL, the UE 30 can additionally be configured with up to four carrier BWPs in the supplementary UL with a single supplementary UL carrier BWP being active at a given time.

For a carrier BWP with a given numerology $\mu_i$, a contiguous set of physical resource blocks (PRBs) are defined and numbered from 0 to $N_{BWP,i}^{size}$, where i is the index of the carrier BWP. A resource block (RB) is defined as 12 consecutive subcarriers in the frequency domain.

Multiple orthogonal frequency-division multiplexing (OFDM) numerologies, $\mu_i$, are supported in NR as given by Table 1 below, where the subcarrier spacing, $\Delta f$, and the cyclic prefix for a carrier bandwidth part are configured by different higher layer parameters for DL and UL, respectively.

TABLE 1

Supported transmission numerologies.

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

The base station 20 transmits information to the UE 30 on DL physical channels. A physical DL channel corresponds to a set of REs carrying information originating from higher layers. The physical DL channels currently defined include the Physical Downlink Shared Channel (PDSCH), the Physical Downlink Control Channel (PDCCH) and the Physical Downlink Broadcast Channel (PBCH). The PDSCH is the main physical channel used for unicast DL data transmission, but also for transmission of random access responses (RARs), certain system information blocks (SIBs), and paging information. The PDCCH is used for transmitting DL control information (DCI), mainly scheduling decisions, required for reception of the PDSCH, and for UL scheduling grants (SGs) enabling transmission on Physical Uplink Shared Channel (PUSCH). The PBCH carries the basic system information (SI) required by the UE 30 to access the network 10.

The base station 20 is responsible for scheduling DL transmissions to the UE 30 on the PDSCH and for allocating resources for the DL transmissions. The base station 20 sends downlink control information (DCI) to the UE 30 on the PDCCH to schedule a DL transmission UE 30. The DCI includes scheduling information such as the allocated resources for the DL transmission and the modulation and coding scheme (MCS).

The UE 30 transmits information to the base station 20 on physical UL channels. A physical UL channel corresponds to a set of REs carrying information originating from higher layers. The physical UL channels currently defined include the Physical Uplink Shared Channel (PUSCH), the Physical Uplink Control Channel (PUCCH) and the Physical Random Access Channel (PRACH). The PUSCH is the UL counterpart to the PDSCH. The PUCCH is used by UEs 30 to transmit UL control information (UCI), including Hybrid Automatic Repeat Request (HARQ) acknowledgements, channel state information (CSI) reports, etc. The PRACH is used for random access preamble transmission.

The base station 20 is responsible for scheduling UL transmissions from the UE 30 and for allocating resources for the UL transmissions. After scheduling an UL transmission and allocating resources, the base station 20 sends a scheduling grant (SG) to the UE 30 indicating the resources on which the UE 30 has been scheduled and the transmission format for the scheduled transmission. The UL grant is sent to the UE 30 on the PDCCH. After receiving the UL, the UE 30 determines the UL transmit power for the transmission and transmits data to the base station 20 on the PUSCH resources indicated in the SG.

Figure 3:
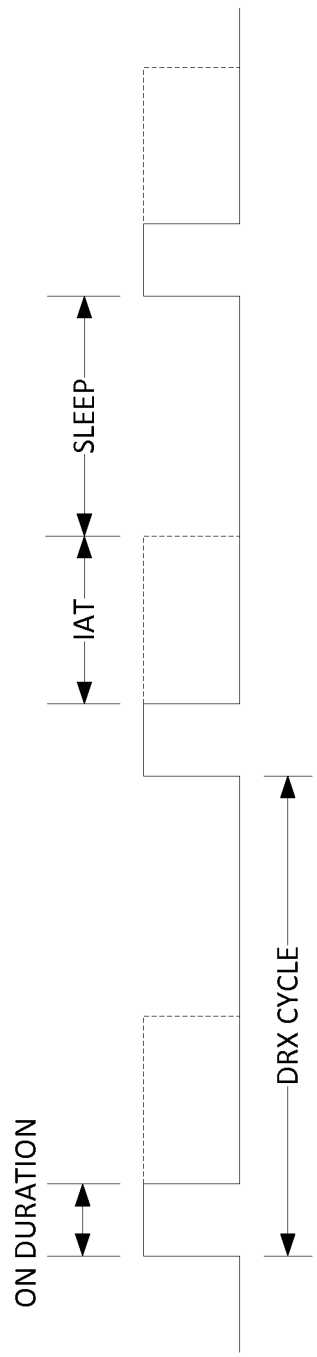
FIG. 3 illustrates an example of DRX operation.

Discontinuous reception (DRX) is a technique for conserving power in a UE 30 30. DRX allows UE 30 to transition to lower power state or "sleep mode" when it is not required to receive DL transmissions from the base station 20 and to wake up periodically to monitor for paging messages and scheduling information. FIG. 3 illustrates DRX operation in simplified form. A DRX cycle is defined by a DRX period and an OnDuration during which the UE 30 wakes up and monitors the PDCCH for DCI addressed to the UE 30. If the UE 30 detects DCI addressed to the UE 30, the UE 30 starts an inactivity timer (IAT) and continues to monitor the PDCCH until the inactivity timer expires. The inactivity timer determines the number of consecutive PDCCH-subframe(s) or slots during which the UE 30 will remain awake after the subframe or slot in which the PDCCH indicates an initial UL, DL or sidelink (SL) data transmission for the UE 30. If the UE 30 receives DCI addressed to the UE 30, it extends the inactivity timer and continues to monitor the PDCCH. When the inactivity timer expires, the UE 30 has the opportunity to sleep until the beginning of the next OnDuration. In one embodiment the UE 30 stops receiving transmissions from base station 20 (e.g. no control monitoring) when the inactivity timer expires and goes to sleep until beginning of the next DRX cycle. The OnDuration and the time duration during which the inactivity timer is running is generally referred to as active time.

DRX functionality is typically configured by Radio Resource Control (RRC), which operates on a slower time scale than the Medium Access Control (MAC) layer or physical layer. Thus, the DRX parameter settings cannot be changed as fast through RRC configuration, especially if the UE 30 has a mix of traffic types.

Given the very wideband operation, very large peak rates, and fast processing time required by NR systems, the UE power consumption is of great interest. The present disclosure provides techniques to reduce or adapt DRX operations through L1 signaling.

For example, in embodiments of the present disclosure, power consumption can be reduced by implementing fast adaptation of the DRX setting via L1 signaling. UE feedback can be incorporated to ensure robust signaling mechanism.

DCI-Based or 1:1-Based Control of DRX Setting

According to one aspect of the disclosure, DL control information (DCI) related to DRX can be transmitted to a UE 30 via L1 signaling. The DCI may be used, for example, to control or to adapt DRX settings. The DCI can be included in downlink control message scheduling a data transmission, or in a separate downlink control message.

In one embodiment, DCI for controlling DRX settings is carried in a downlink control message (e.g., PDCCH message) that schedules data transmissions on the PDSCH, PUSCH or SFI. For example, a power-savings indication (e.g. GTS signal) may be included in a downlink control message transmitted on the PDCCH that schedules a data transmission on the PDSCH, PUSCH or other channel. Additionally, a DCI related to DRX can be embedded in or transmitted with channel state information (CSI), sounding reference signals (SRSs) or other reference signals.

In another embodiment, DCI for controlling DRX settings can be sent to the UE 30 in a separate downlink control message (e.g., PDCCH message) specially used for controlling UE wake-up/go-to-sleep behavior. In this case, the downlink control message is used only for the power-savings indication and does not include DCI scheduling a data transmission on the PDSCH or PUSCH. The downlink control message may address the UE 30 using a special Radio Network Temporary Identifer (RNTI) configured for power-savings such as a PDCCH Monitoring RNTI (PM-RNTI), a special RNTI for DRX control (DX-RNTI), or Power Saving RNTI (PS-RNTI).

According to one aspect of the disclosure, the DCI comprises a GTS signal that instructs the UE 30 to enter a sleep mode or low power mode. DCI-based or L1 based GTS signaling performs better in presence of confirmation from the UE 30. For example, the UE 30 can send an acknowledgement (ACK) to the base station 20 indicating that the downlink control message carrying the GTS signal has been received by the UE 30. Feedback is present if the GTS signal is contained in a downlink control message scheduling a DL transmission on the PDSCH. If the DCI comprises a GTS signal only, an ACK can still provide benefit in case of missed assignments (e.g., otherwise the UE 30 will stay awake until the inactivity timer expires) and the reliability requirements for GTS can be bit relaxed. In principle, the GTS DCI can have a field or information element (IE) that indicates whether UE 30 should confirm reception or not (e.g., one of PUCCH resources configured in the DCI could be a null resource).

In some methods of DCI-based GTS signaling, confirmation may not be required. If the UE 30 detects a GTS signal, it just goes to sleep. Sending an ACK signal is not necessary, as the network has nothing to send to the UE 30 in later PDCCH transmissions. One possible concern is false alarm, i.e., when the UE 30 falsely detects a GTS signal.

In some embodiments, multiple DRX configurations can be configured for the UE 30 via RRC signaling and a subset of the multiple sets of configurations can be activated via L1 signaling or a Medium Access Control (MAC) Control Element (MAC-CE) based signaling.

Adapting Inactivity Timer Via DCI Embedded In PDCCH Scheduling Message

When UE 30 is configured for DRX operation, the inactivity timer value set by higher layers can be adapted or modified through L1 signaling. New or existing information elements (IEs) in a downlink control message scheduling a data transmission on the PDSCH or PUSCH can be used to set or control the IAT value. For ease of reference, a downlink control message scheduling a data transmission is referred to herein as a scheduling message. In NR, such scheduling messages are transmitted on the PDCCH. The L1 signaling may indicate, for example, that the UE 30 should continue current PDCCH monitoring behavior or immediately transition to a power-savings state.

Figure 4:
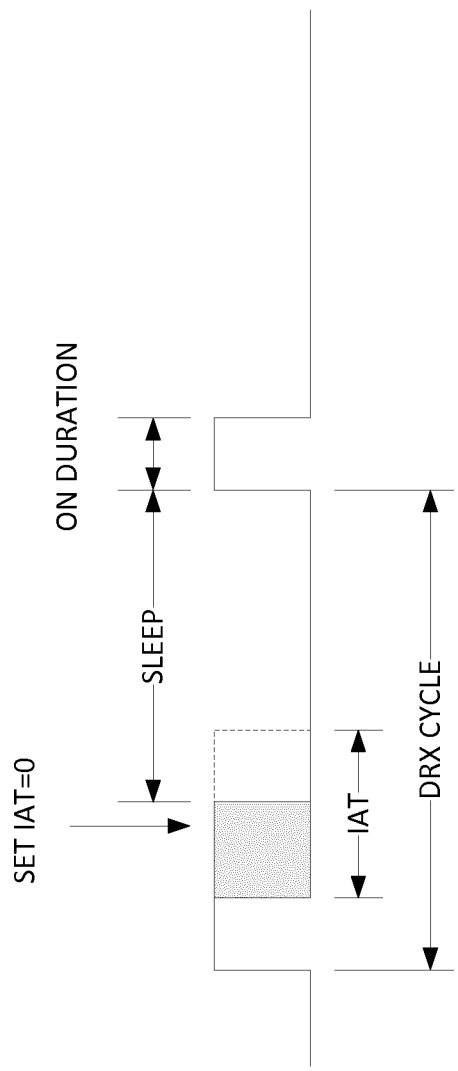
FIG. 4 illustrates an example of how PDCCH monitoring can be adapted.

FIG. 4 illustrates an early termination of the inactivity timer (i.e., the active time) responsive to a DCI received via L1 signaling. In this example, a first setting (e.g., code point 1) of one or more IEs in the scheduling message indicates that the UE 30 should follow normal DRX operation shown by dotted lines. In this case, if an IAT is running, the UE 30 continues to apply current PDCCH monitoring settings until the IAT expires. A second setting (e.g., code point 2) of the one or more IEs indicates that, the UE 30 should act as if the IAT is expired shown by solid fill. In this case, the UE 30 can:

set IAT=0 and immediately go to a power savings state (e.g., no PDCCH monitoring)

set IAT=0 and go to a power savings state when all scheduled data transmissions are complete (e.g. HARQ retransmission timer has expired or UE 30 has sent HARQ-ACK, etc.).

The second setting or code point may be considered a command or instruction to go to sleep or set IAT=0.

In one embodiment, the UE 30 receives a scheduling message via the PDCCH scheduling a downlink transmission to the UE 30 on the PDSCH in a first time slot. The scheduling message includes one or more IEs containing first DCI for scheduling the data transmission. The same scheduling message further includes one or more IEs containing second DCI for adjusting the DRX settings. For example, a first DCI may contain a DL resource assignment (e.g., allocation of time and or frequency domain resources) for the scheduled data transmission on the PDSCH. The second DCI may comprise an indication to adjust or override the current DRX settings. The UE 30 is configured to adjust the DRX parameters or decide whether to go to a low power mode based at least in part on the second DCI. The decision may also be based on the type of HARQ-ACK response sent the by the UE 30 in response to decoding the data received on the PDSCH that is scheduled via the same PDCCH message.

Table 1 below illustrates one example of UE behavior responsive to DCI adjusting DRX settings.

TABLE 1

Example of UE Behavior Responsive to DCI Adjusting DRX

| Second DCI | HARQ-ACK response of DL data scheduled by PDCCH | Impact on DRX parameter settings |
|---|---|---|
| A | ACK | Continue normal DRX operation (e.g., extend active time) |
| A | NACK | Continue normal DRX operation (e.g., extend active time) |
| B | ACK | Set IAT to expiration (e.g., IAT = 0) |
| B | NACK | Continue normal DRX operation (e.g. extend active time) |

In this example, if the DCI is A (e.g., 0), the UE 30 continues normal DRX operation. That is, the UE 30 follows the DRX settings configured by higher layers. In particular, the UE 30 sets/resets the IAT timer according to the DRX configuration provisioned by higher layers (e.g. RRC). In this case, the UE 30 remains in active state while the IAT inactivity timer is running and goes to the low power state only when the IAT expires. That is, the UE 30 does not go to sleep early. If the second DCI is B (e.g., 1), the behavior of the UE 30 depends on the HARQ response to the scheduled PDSCH transmission. If the downlink transmission is not correctly decoded and a negative acknowledgement (NACK) is sent by the UE 30, the UE 30 continues normal DRX operation as configured by higher layers. That is, the UE 30 remains in active state and sets the IAT value according to the DRX configuration provisioned by higher layers. If the downlink transmission is correctly decoded and an ACK is sent by the UE 30, the UE 30 can set the IAT=0 and immediately go to sleep or go to a lower power state where it monitors the PDCCH less frequently than it does during the active state.

In another embodiment, the UE 30 receives, in a first time slot, a scheduling message via the PDCCH scheduling an uplink transmission from the UE 30 on the PUSCH. The scheduling message includes one or more IEs containing first DCI for scheduling the data transmission in a second time slot. The same scheduling message further includes one or more IEs containing second DCI for adjusting the DRX settings. For example, the first DCI may contain a UL resource assignment (e.g., allocation of time and or frequency domain resources) for scheduling a data transmission on the PUSCH. The second DCI may comprise an indication to adjust or override the current DRX settings. The UE 30 is configured to adjust DRX parameters or decide whether to go to a low power mode based at least in part on the second DCI. The decision may also be based on whether the uplink transmission is successful. For example, the UE 30 can check whether another scheduling message scheduling a retransmission of the UL data transmission is received on the PDCCH. If so, the UE 30 remains in active state. If no retransmission is scheduled, the UE can set the IAT=0 and go to sleep, or transition to a low power state or DRX state where it monitors the PDCCH less frequently than it does in active time.

In one embodiment, the UE 30 can monitor the PDCCH for a fixed number of slots following the scheduled PUSCH transmission to check for a scheduling message scheduling a retransmission. If the UE 30 does not receive, in the fixed number of slots, a downlink control message scheduling an UL or DL transmission, it can go to sleep or enter a low power state. If the UE 30 receives a scheduling message scheduling an UL or DL transmission, it can extend or reset the active time (e.g., reset the IAT). The fixed number of slots can be configured by higher layers.

More generally, the UE 30 can be configured with a DRX configuration by a higher layer protocol (e.g. RRC), and L1 signaling can be used to adapt or override the DRX configuration. For example, the L1 signaling may be used to modify operation of the IAT. The DCI adjusting or modifying the DRX settings can be included in a scheduling message used to schedule a data transmission on the PDSCH or PUSCH. Alternatively, the DCI adapting or overriding the DRX configuration can be included in a separate downlink control message adapted for that purpose. The DCI transmitted via L1 signaling may indicate that the UE 30 should continue applying current DRX settings or transition to low power state. A power savings state can be a low power state where PDCCH monitoring is reduced or discontinued (e.g. a sleep state). Low power states can be further distinguished by varying levels of PDCCH monitoring.

In some embodiments, the DCI for adjusting or overriding the DRX settings comprises one of two or more possible values. A first value of the DCI causes the UE 30 to apply or continue to apply the current DRX settings and to set the IAT in accordance with the current DRX settings. If an IAT is running, the UE 30 remains awake until expiration of the IAT. A second value of the DCI causes the UE 30 to set the IAT=0 and go to a low power state when a scheduled data transmission is successful. For example, in the case of a DL transmission, the UE 30 may go to the low power state when the HARQ retransmission timer has expired or UE has sent HARQ-ACK for the scheduled packet. In the case of an UL transmission, the UE 30 may go to the low power state when no DCI scheduling a retransmission is received within a preconfigured number of slots.

In some embodiments, the second value may cause the UE 30 to immediately go to sleep and/or set the IAT=0. If the base station 20 sends the UE 30 to sleep, the UE 30 may wake up after the current DRX cycle (at the next ON duration).

In some embodiments, the ON duration and DRX cycle values are configured by higher layers (e.g. RRC) and those values are maintained, while only the IAT is updated via L1 signaling. In other embodiments, L1 signaling adapts other DRX configuration parameters, such as the ON duration and DRX cycle. In one embodiment, the L1 signaling adapts the IAT and at least one other DRX parameter (e.g., OnDuration and/or DRX cycle).

Power Saving IE in DCI

This section discusses in more detail how the L1-based power saving mechanism is enabled to use DCI, and is applicable to any power-savings IE indication scheme.

In exemplary embodiments, the UE 30 can be configured to monitor a new DCI message for power-savings, or an existing DCI message (e.g., from 1_0/1_1/ . . . ) with specific settings for certain IEs. The Radio Network Temporary Identifer (RNTI) may be an existing RNTI (e.g., a Cell-RNTI (C-RNTI) or MCS-C-RNTI) or a new RNTI.

When an existing DCI message is used, an existing IE or combination of existing IEs in the DCI may be used to indicate the power-savings. For example, a joint indication may be used to signal power-saving parameters by fixing some of the IEs to a pre-determined value. In certain cases, a typical DCI IE setting that is either invalid or rare in scheduling can be explicitly used to indicate power savings indicator.

As an example, the contents a of DCI format 1_0 with CRC scrambled by C-RNTI/CSRNTI is as follows:

Identifier for DCI formats—1 bits
   The value of this IE is always set to 1, indicating a DL DCI format
Frequency domain resource assignment (RA)—

$\lceil \log_2(N_{RB}^{DL,BWP}(N_{RB}^{DL,BWP}+1)/2) \rceil$ bits $N_{RB}^{DL,BWP}$ is the size of the active DL bandwidth part in case DCI format 1_0 is monitored in the UE specific search space and satisfying
   the total number of different DCI sizes configured to monitor is no more than 4 for the cell, and
   the total number of different DCI sizes with C-RNTI configured to monitor is no more than 3 for the cell otherwise, $N_{RB}^{DL,BWP}$ is the size of CORESET 0.
Time domain resource assignment (RA)—4 bits as defined in Subclause 5.1.2.1 of [6, TS 38.214]
VRB-to-PRB mapping—1 bit according to Table 7.3.1.1.2-33
Modulation and coding scheme (MCS)—5 bits as defined in Subclause 5.1.3 of [6, TS 38.214]
New data indicator (NDI)—1 bit
Redundancy version (RV)—2 bits as defined in Table 7.3.1.1.1-2
HARQ process number—4 bits
Downlink assignment index—2 bits as defined in Subclause 9.1.3 of [5, TS 38.213], as counter DAI
TPC command for scheduled PUCCH—2 bits as defined in Subclause 7.2.1 of [5, TS 38.213]
PUCCH resource indicator—3 bits as defined in Subclause 9.2.3 of [5, TS 38.213]
PDSCH-to-HARQ feedback timing indicator—3 bits as defined in Subclause 9.2.3 of [5, TS38.213]

For signaling, the following IEs in DCI 1_0 message can be used to signal parameters related to PDCCH monitoring or power savings:
   MCS IE can be set to a predetermined value or value range (such as corresponding to "reserved" in MCS table)
   RV IE can be set to predetermined value (such as RV3 or ry index=3)
   NDI can be toggled
   Frequency domain or time domain RA can be set to a pre-determined value (such as 0)

As another example, the NDI filed can be toggled with the MCS filed set to "reserved", which is normally an invalid state, but can be used as a power savings indicator.

In some embodiments, a DCI message carrying power savings parameters may use a new RNTI indicating that the DCI contains power saving parameters. The new RNTI can be configured via higher layers. The UE 30 monitors the DCI for the new power savings RNTI in one or more search spaces. The search space(s) can be UE-specific (e.g., UE-specific search space) or common (e.g., a Type 3 common search space). The power-savings RNTI can be separately configured for a given DCI format, including UL and DL DCI formats, such as 0-0,0-1, 1-0 and 1-1.

In some embodiments, the power saving indication can be including in DCI scheduling transmissions on the PDSCH or PUSCH. In this case, the UE 30 may be configured with specific IEs i related to power-savings in a scheduling message, such as a DCI Format 1-0 or 1-1 message that schedules a PDSCH transmission.

Figure 5:
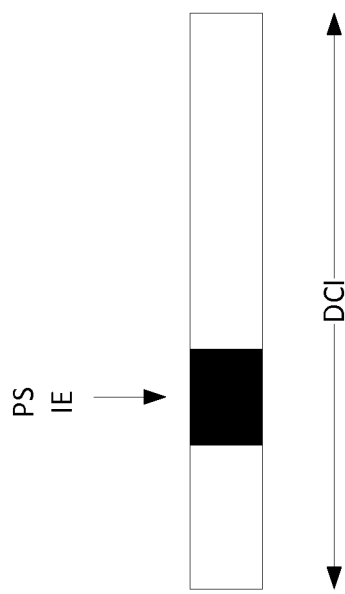
FIG. 5 illustrates an example of DCI carrying information for adapting PDCCH monitoring and/or power saving.

FIG. 5 illustrates an example of DCI including a PS (power savings) IE. The DCI may be dedicated for power savings or some of the IEs in the DCI may also be used for scheduling data transmission to or from the UE 30. In case of dedicated DCI for power savings, the UE 30 may be configured either with UE-specific RNTI or a UE-group-specific RNTI that may be different from the C-RNTI of the UE 30.

In some embodiments, the DCI can be addressed to a group of UEs 30, and a bitmap in the DCI can indicate which UE 30 should apply the power saving configurations. A new power saving RNTI can be configured via higher layers per group of UEs 30 that have the same or similar PDCCH search space settings. In this way, the network 10 can send the power saving DCI as outlined before but include a bitmap to indicate which UE 30 in the group should follow the power saving configurations. If the UE 30 sees in the bitmap that it cannot take advantage of power-savings, and the UE 30 may have a DCI address to it during its current active time or OnDuration of a DRX cycle.

Figure 6:
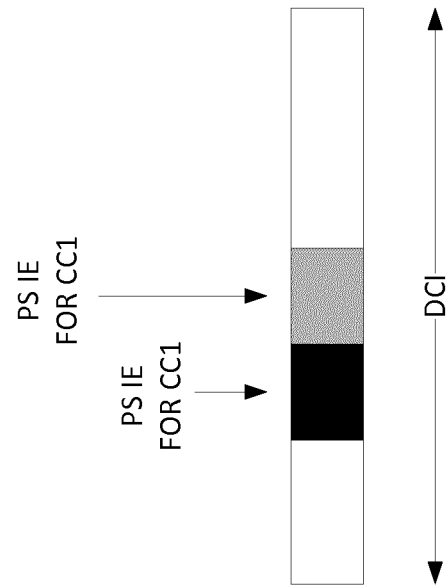
FIG. 6 illustrates another example of DCI carrying information for adapting PDCCH monitoring and/or power saving.

If UE 30 is configured with multiple serving cells, the power savings can be indicated separately for each activated serving cell (and on the respective serving cell/scheduling cell), or a single DCI may be used to indicate power savings for a group of serving cells as shown in FIG. 6. Moreover, it is also possible to indicate through the DCI which serving cell is active during the current or next N DRX cycles. That is the L1 signaling can actively control the number of serving cells that the UE 30 needs to monitor.

Figure 7:
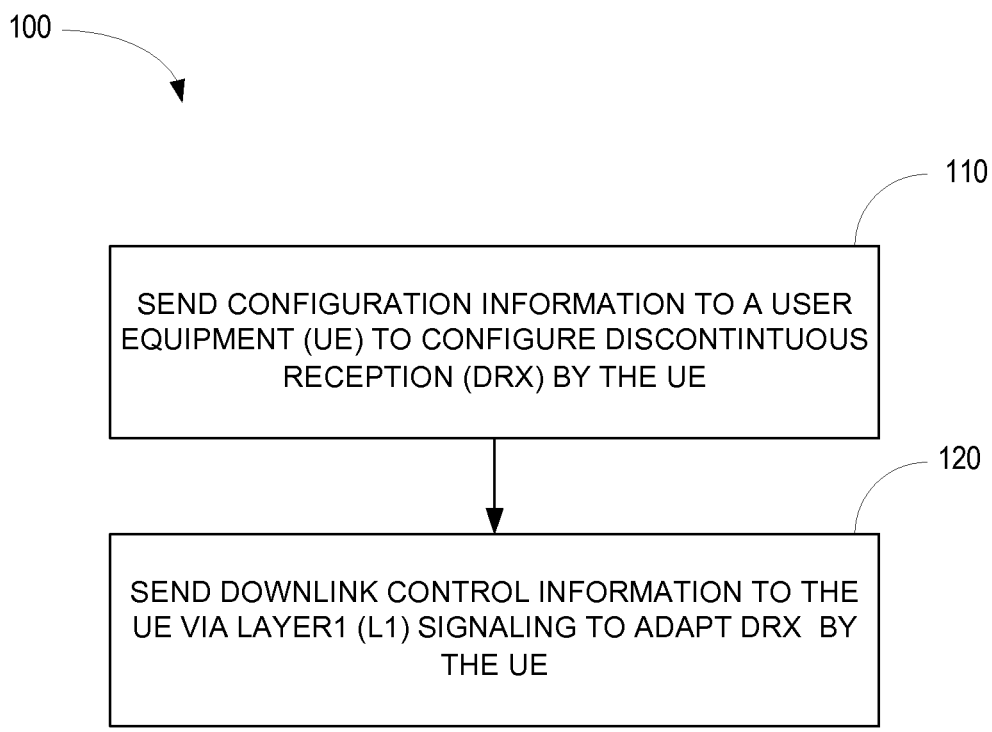
FIG. 7 illustrates a method implemented by a UE.

FIG. 7 illustrates an exemplary method 100 performed by a base station 20. The base station 20 sends configuration information to a UE 30 to configure DRX by the UE (block 110). The base station 20 further sends downlink control information to the UE via layer 1 (L1) signaling to control or adapt DRX by the UE 30 (block 120). In some embodiments of the method 100, the configuration information includes a setting for an inactivity timer applied by the UE during DRX and the downlink control information controls or adapts the inactivity timer. For example, the downlink control information may instruct the UE 30 to stop the inactivity timer before expiration of the inactivity timer.

In some embodiments of the method 100, the downlink control information may be sent to the UE in a downlink control message scheduling a data transmission to the UE on a downlink shared channel. The downlink control information may instruct the UE 30 to either apply or adjust (including overriding) the inactivity timer depending on a HARQ response associated with the downlink transmission.

In some embodiments of the method 100, the downlink control information may be sent to the UE in a downlink control message scheduling a data transmission from the UE on an uplink shared channel. The downlink control information may instruct the UE 30 to either apply or adjust (including overriding) the inactivity timer depending on whether a retransmission associated with the uplink transmission is requested by the base station 20.

In some embodiments of the method 100, the downlink control information may be sent to the UE 30 is a separate control message.

In some embodiments of the method 100, the downlink control information may comprise a GTS signal that overrides normal DRX.

Figure 8:
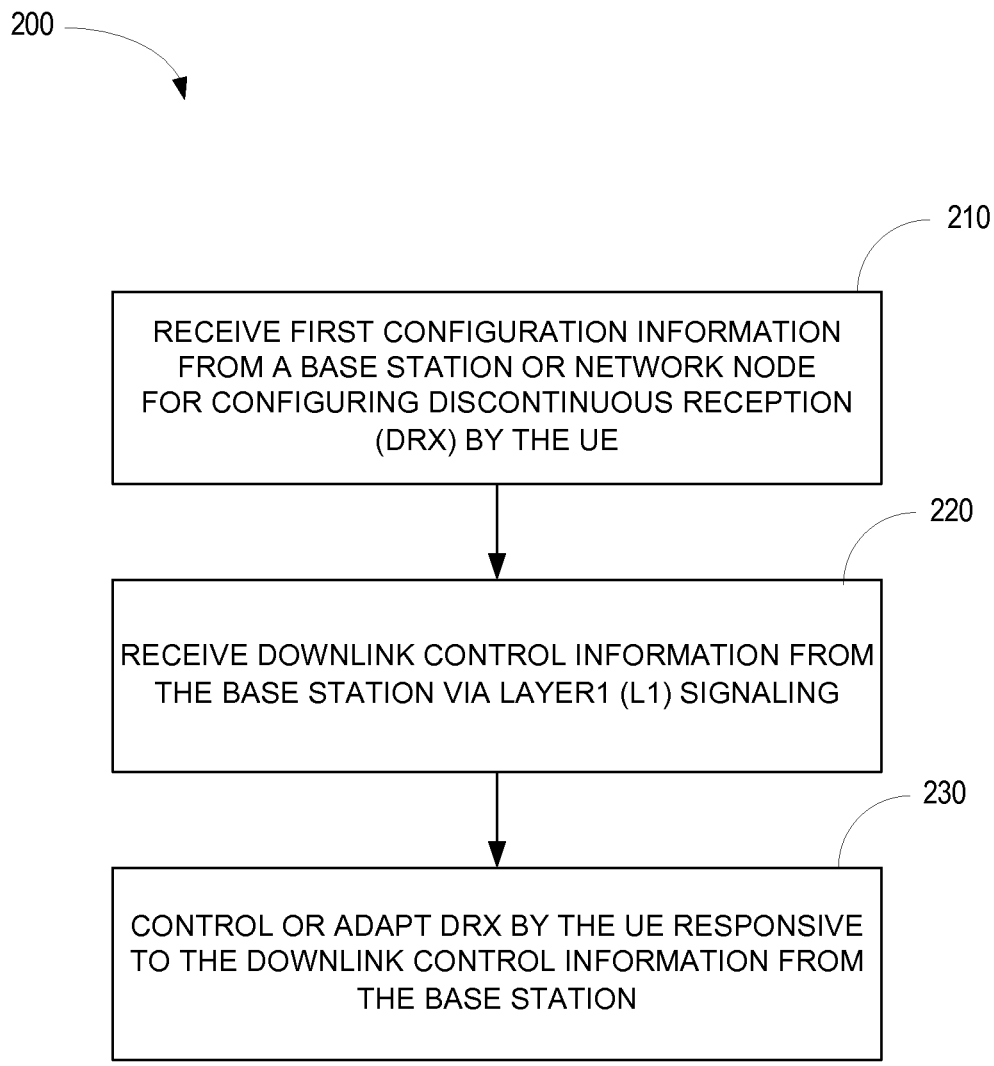
FIG. 8 illustrates a method implemented by a base station of configuring measurement reporting for a UE.

FIG. 8 illustrates an exemplary method 200 performed by a UE 30 according to an embodiment. The UE 30 receives configuration information from a base station or network node for configuring discontinuous reception (DRX) by the UE (block 210). The UE 30 further receives downlink control information from the base station via L1 signaling (block 220). The UE 30 controls or adapts DRX by the UE 30 responsive to the downlink control information from the base station 20 (block 230).

In some embodiments of the method 200, the configuration information includes a setting for an inactivity timer applied by the UE 30 during DRX and UE 30 controls or adapts the inactivity time based on the downlink control information. For example, the downlink control information may instruct the UE 30 to stop the inactivity timer before expiration of the inactivity timer.

In some embodiments of the method 200, the downlink control information may be sent to the UE in a downlink control message scheduling a data transmission to the UE 30 on a downlink shared channel. The UE 30 decodes the scheduled data transmission on the downlink shared channel and controls or adapts the inactivity timer based on the DCI and an HARQ response associated with the scheduled data transmission.

In some embodiments of the method 200, the downlink control information may be sent to the UE in a downlink control message scheduling a data transmission from the UE on an uplink shared channel. The downlink control information may instruct the UE 30 to either apply or adjust (including overriding) the inactivity timer depending on whether a retransmission associated with the uplink transmission is requested by the base station 20.

In some embodiments of the method 200, the downlink control information may be sent to the UE 30 is a separate control message without any scheduling information.

In some embodiments of the method 200, the downlink control information may comprise a GTS signal that overrides normal DRX.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
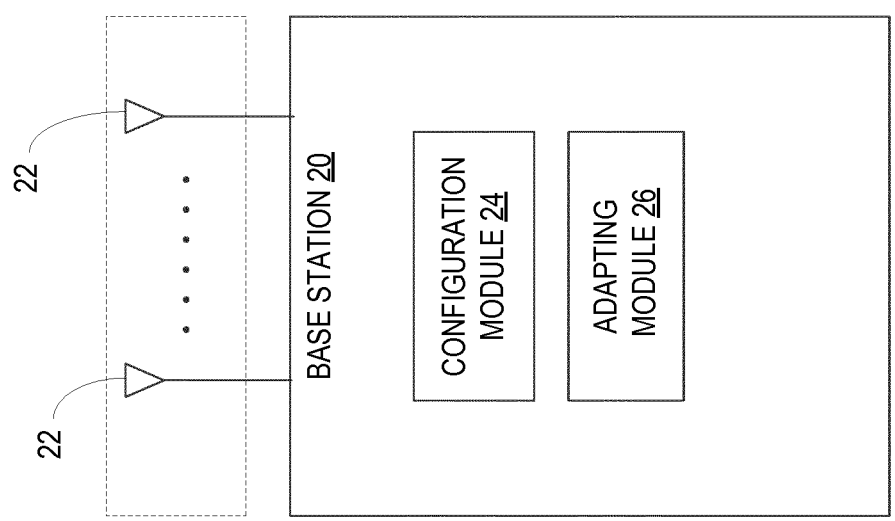
FIG. 9 is a schematic block diagram of an exemplary UE.

FIG. 9 illustrates a base station 20 in accordance with one or more embodiments. The base station 20 comprises on or more antennas 22, a configuration module 24 and an adapting module 26. The various modules 24 and 26 can be implemented by hardware and/or by software code that is executed by a processor or processing circuit. The configuration module 24 is configured to send configuration information to a UE 30 to configure discontinuous reception (DRX) by the UE 30. The adapting module 26 is configured to send downlink control information to the UE L1 signaling to control or adapt DRX by the UE 30.

Figure 10:
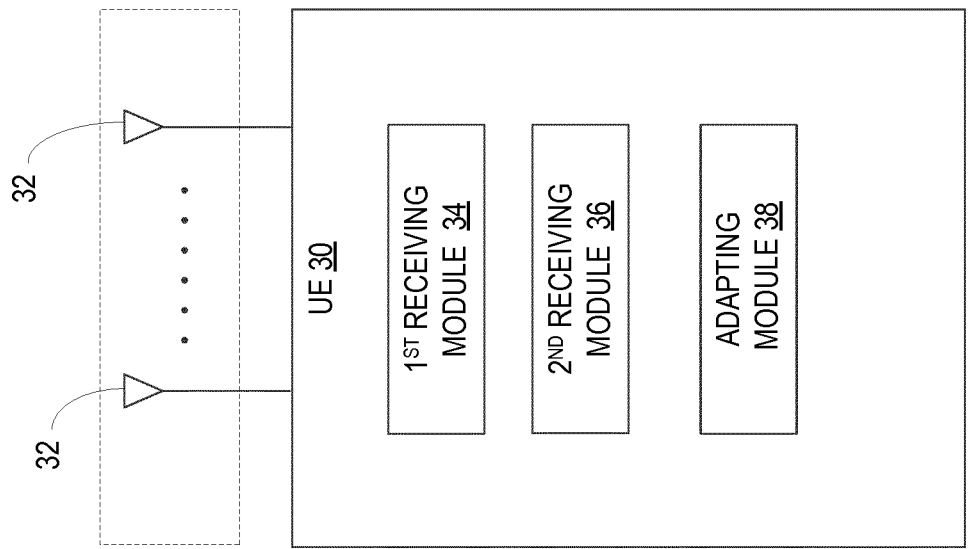
FIG. 10 is a schematic block diagram of an exemplary base station.

FIG. 10 illustrates a UE 30 in accordance with one or more embodiments. The UE 30 comprises one or more antennas 32, a first receiving module 34, a second receiving module 36, and an adapting module 38. The various modules 34, 36, and 38 can be implemented by hardware and/or by software code that is executed by one or more processors or processing circuits. The first receiving module 34 is configured to receive configuration information from a base station or network node for configuring discontinuous reception (DRX) by the UE 30. The second receiving module 36 is configured to receive downlink control information from the base station 20 via L1 signaling. The adapting module 38 is configured to control or adapt DRX by the UE 30 responsive to the downlink control information from the base station 20.

Figure 11:
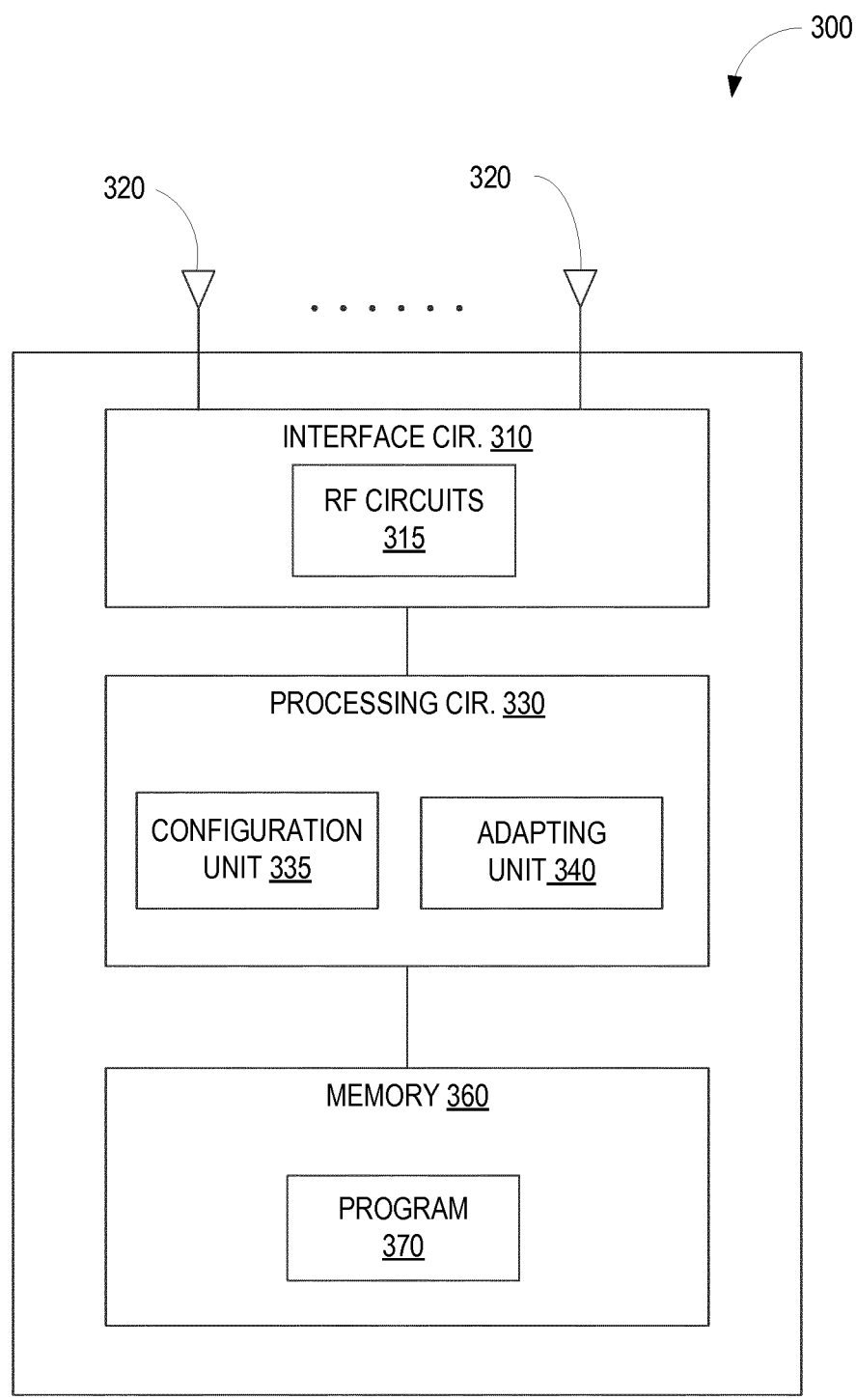
FIG. 11 is a functional block diagram of a base station according to an embodiment.

FIG. 11 illustrates a base station 300 according to one embodiment that may be configured to perform the methods 100 as herein described. The main functional components of the base station 300 comprise an interface circuit 310, a processing circuit 330, and memory 360.

The interface circuit 310 is coupled to one or more antennas 320 and comprises the radio frequency (RF) circuitry 315 configured to transmit and receive signals over a wireless communication channel.

The processing circuit 330 controls the overall operation of the base station 300 and processes the signals transmitted to or received by the base station 300. Such processing includes coding and modulation of transmitted data signals, and the demodulation and decoding of received data signals. The processing circuit 330 may comprise one or more microprocessors, hardware, firmware, or a combination thereof. In one embodiment, the processing circuit 330 comprises a configuration unit 335 and an adapting unit 340. The configuration unit 335 is configured to send configuration information to a UE 30 to configure discontinuous reception (DRX) by the UE 30. The adapting unit 340 is configured to send downlink control information to the UE L1 signaling to control or adapt DRX by the UE 30.

Memory 360 comprises both volatile and non-volatile memory for storing computer program code and data needed by the processing circuit 330 for operation. Memory 360 may comprise any tangible, non-transitory computer-readable storage medium for storing data including electronic, magnetic, optical, electromagnetic, or semiconductor data storage. Memory 360 stores a computer program 370 comprising executable instructions that configure the processing circuit 330 to implement the methods 300 according to FIG. 8 as described herein. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 370 for configuring the processing circuit 330 as herein described may be stored in a removable memory, such as a portable compact disc, portable digital video disc, or other removable media. The computer program 370 may also be embodied in a carrier such as an electronic signal, optical signal, radio signal, or computer readable storage medium.

Those skilled in the art will also appreciate that embodiments herein further include corresponding computer programs 370. A computer program 370 comprises instructions which, when executed on at least one processor of base station 300, causes the base station 300 to carry out any of the respective processing described above. A computer program 370 in this regard may comprise one or more code modules corresponding to the means or units described above. The computer program 370 may be embodied in a carrier containing such an electronic signal, optical signal, radio signal, or non-transitory computer readable storage medium.

Figure 12:
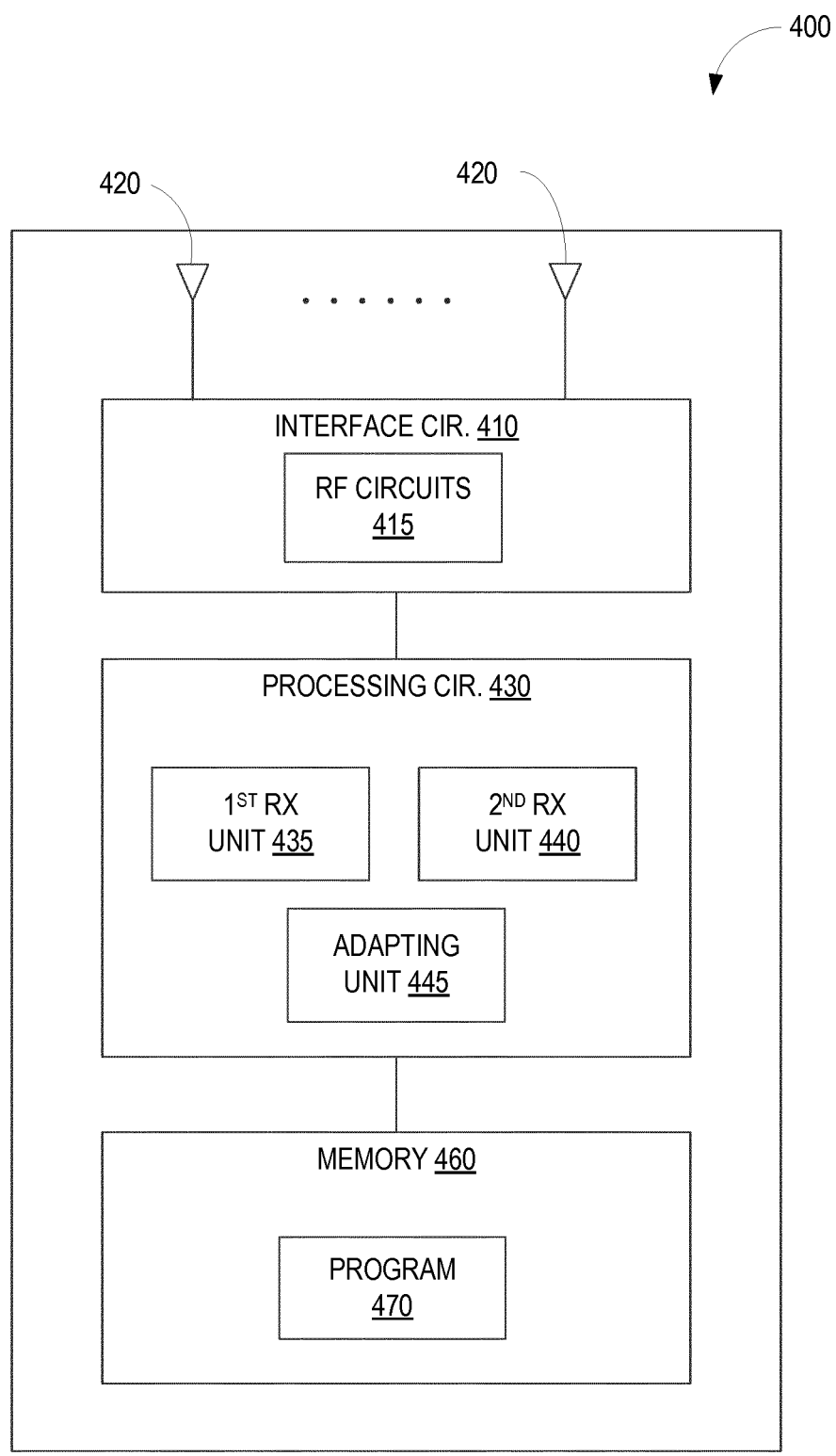
FIG. 12 is a functional block diagram of a UE according to an embodiment.

FIG. 12 illustrates a UE 400 according to one embodiment that may be configured to perform the methods 200 as herein described. The main functional components of the UE 400 comprise an interface circuit 410, a processing circuit 430, and memory 460. The interface circuit 410 is coupled to one or more antennas 420 and comprises the radio frequency (RF) circuitry 415 configured to transmit and receive signals over a wireless communication channel.

The processing circuit 430 controls the overall operation of the UE 400 and processes the signals transmitted to or received by the UE 400. Such processing includes coding and modulation of transmitted data signals, and the demodulation and decoding of received data signals. The processing circuit 430 may comprise one or more microprocessors, hardware, firmware, or a combination thereof.

In one embodiment, the processing circuit 430 comprises a first receiving unit 435, a second receiving unit 440 and an adapting unit 445. The first receiving unit 435 is configured to receive configuration information from a base station or network node for configuring discontinuous reception (DRX) by the UE 30. The second receiving unit 440 is configured to receive downlink control information from the base station 20 via L1 signaling. The adapting unit 445 is configured to control or adapt DRX by the UE 30 responsive to the downlink control information from the base station 20.

Memory 460 comprises both volatile and non-volatile memory for storing computer program code and data needed by the processing circuit 430 for operation. Memory 460 may comprise any tangible, non-transitory computer-readable storage medium for storing data including electronic, magnetic, optical, electromagnetic, or semiconductor data storage. Memory 460 stores a computer program 470 comprising executable instructions that configure the processing circuit 430 to implement the methods 300 according to FIG. 8 as described herein. A computer program in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 470 for configuring the processing circuit 430 as herein described may be stored in a removable memory, such as a portable compact disc, portable digital video disc, or other removable media. The computer program 470 may also be embodied in a carrier such as an electronic signal, optical signal, radio signal, or computer readable storage medium.

Those skilled in the art will also appreciate that embodiments herein further include corresponding computer programs 470. A computer program 470 comprises instructions which, when executed on at least one processor of base station 400, causes the base station 400 to carry out any of the respective processing described above. A computer program 470 in this regard may comprise one or more code modules corresponding to the modules or units described above. The computer program 470 may be embodied in a carrier containing such an electronic signal, optical signal, radio signal, or non-transitory computer readable storage medium.

ADDITIONAL EMBODIMENTS

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 13:
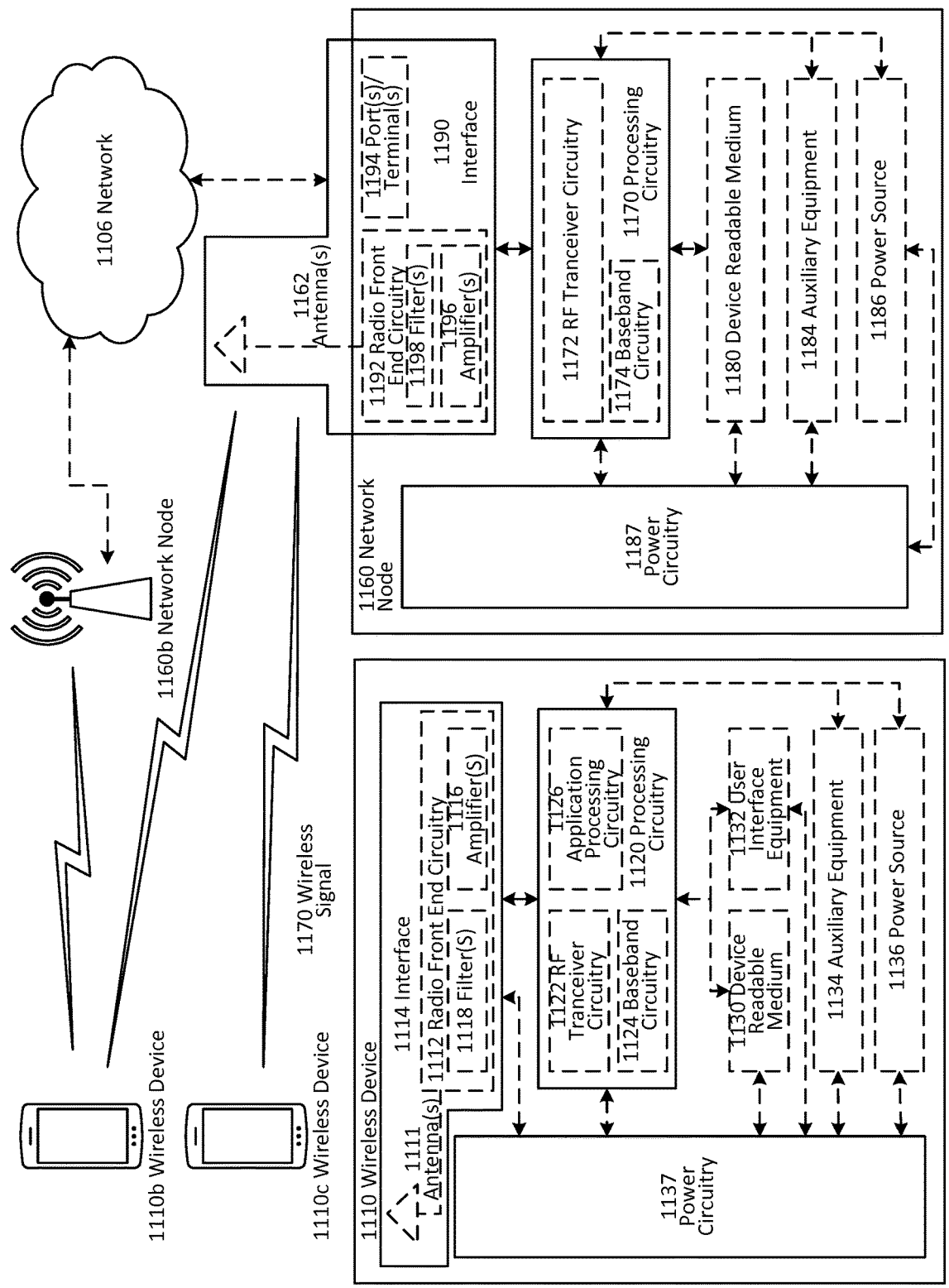
FIG. 13 is a schematic block diagram illustrating an example wireless network, according to particular embodiments of the present disclosure.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and a RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 13 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface

1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc.

The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 14:
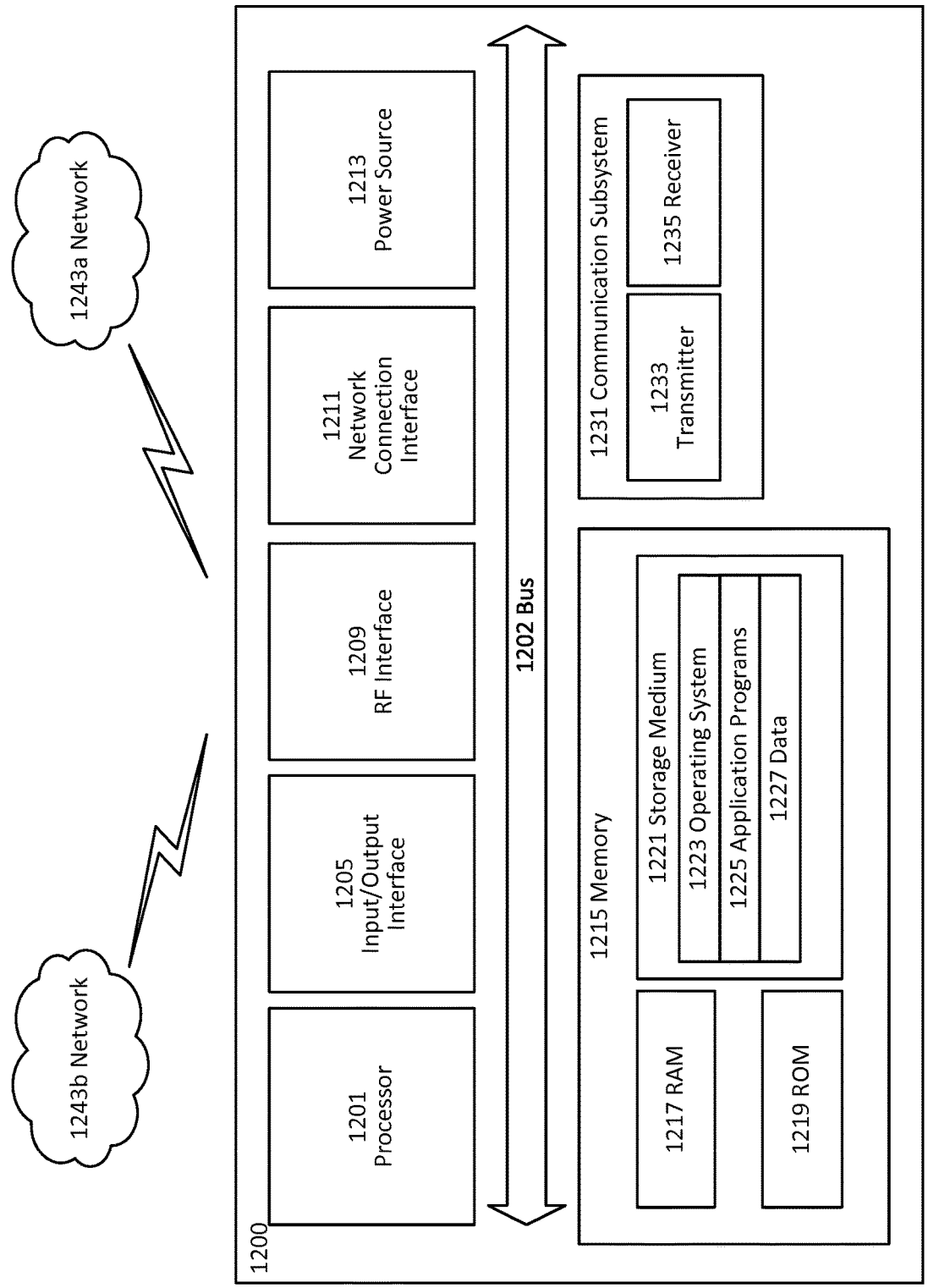
FIG. 14 is a schematic block diagram illustrating an example of a user equipment, according to particular embodiments of the present disclosure.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 12200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1209 may be configured to provide a communication interface to RF components such as a transmitter, a receiver, and an antenna. Network connection interface 1211 may be configured to provide a communication interface to network 1243a. Network 1243a may encompass wired and/or wireless networks such as a local-area network (LAN), a wide-area network (WAN), a computer network, a wireless network, a telecommunications network, another like network or any combination thereof. For example, network 1243a may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 14, processing circuitry 1201 may be configured to communicate with network 1243*b* using communication subsystem 1231. Network 1243*a* and network 1243*b* may be the same network or networks or different network or networks. Communication subsystem 1231 may be configured to include one or more transceivers used to communicate with network 1243*b*. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.14, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243*b* may encompass wired and/or wireless networks such as a local-area network (LAN), a wide-area network (WAN), a computer network, a wireless network, a telecommunications network, another like network or any combination thereof. For example, network 1243*b* may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 15:
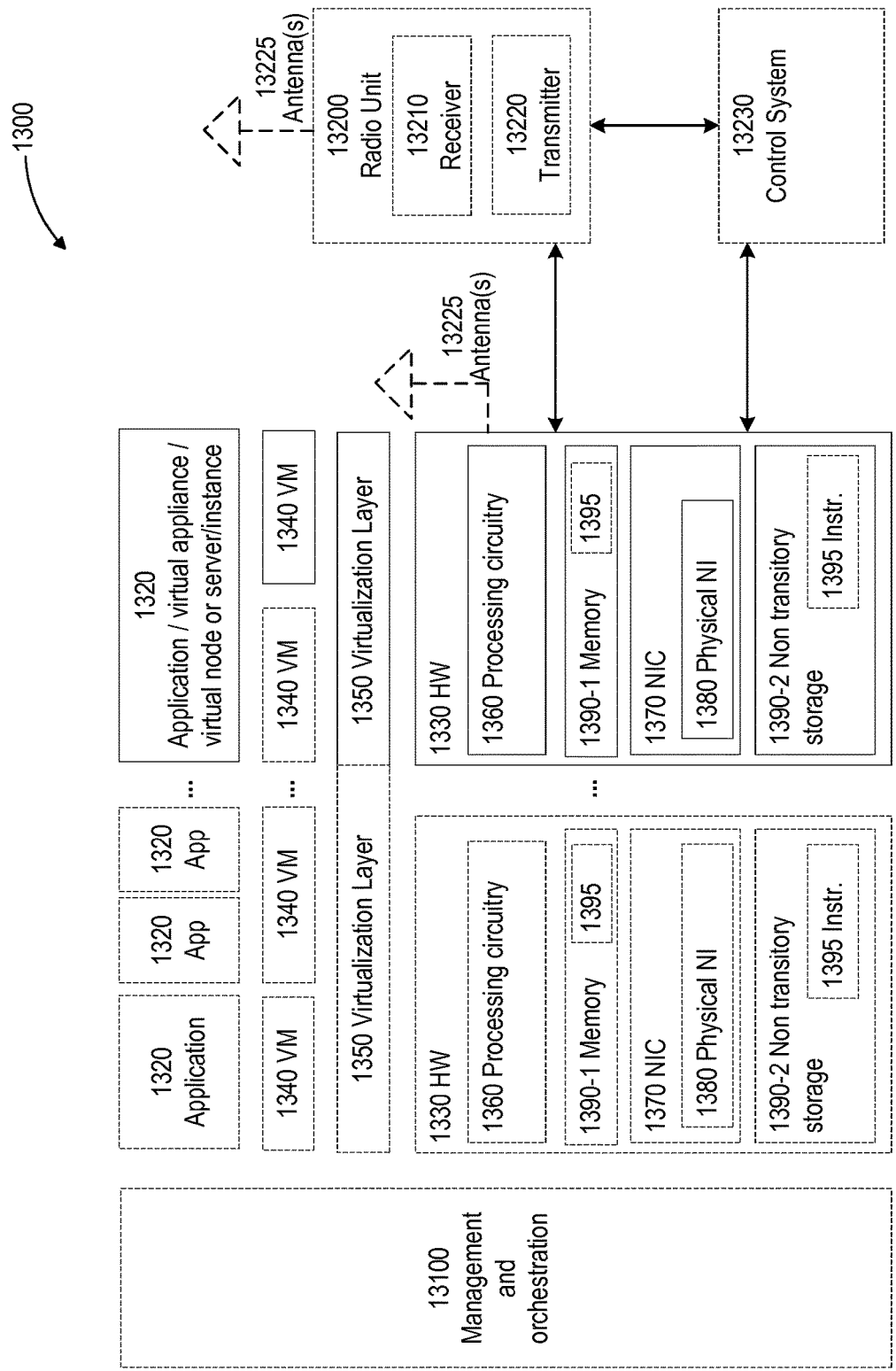
FIG. 15 is a schematic block diagram illustrating an example of a virtualization environment, according to particular embodiments of the present disclosure.

FIG. 15 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 15, hardware 1330 may be a standalone network node with generic or specific components. Hardware 1330 may comprise antenna 13225 and may implement some functions via virtualization. Alternatively, hardware 1330 may be part of a larger cluster of hardware (e.g. such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 15.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be effected with the use of control system 13230 which may alternatively be used for communication between the hardware nodes 1330 and radio units 13200.

Figure 16:
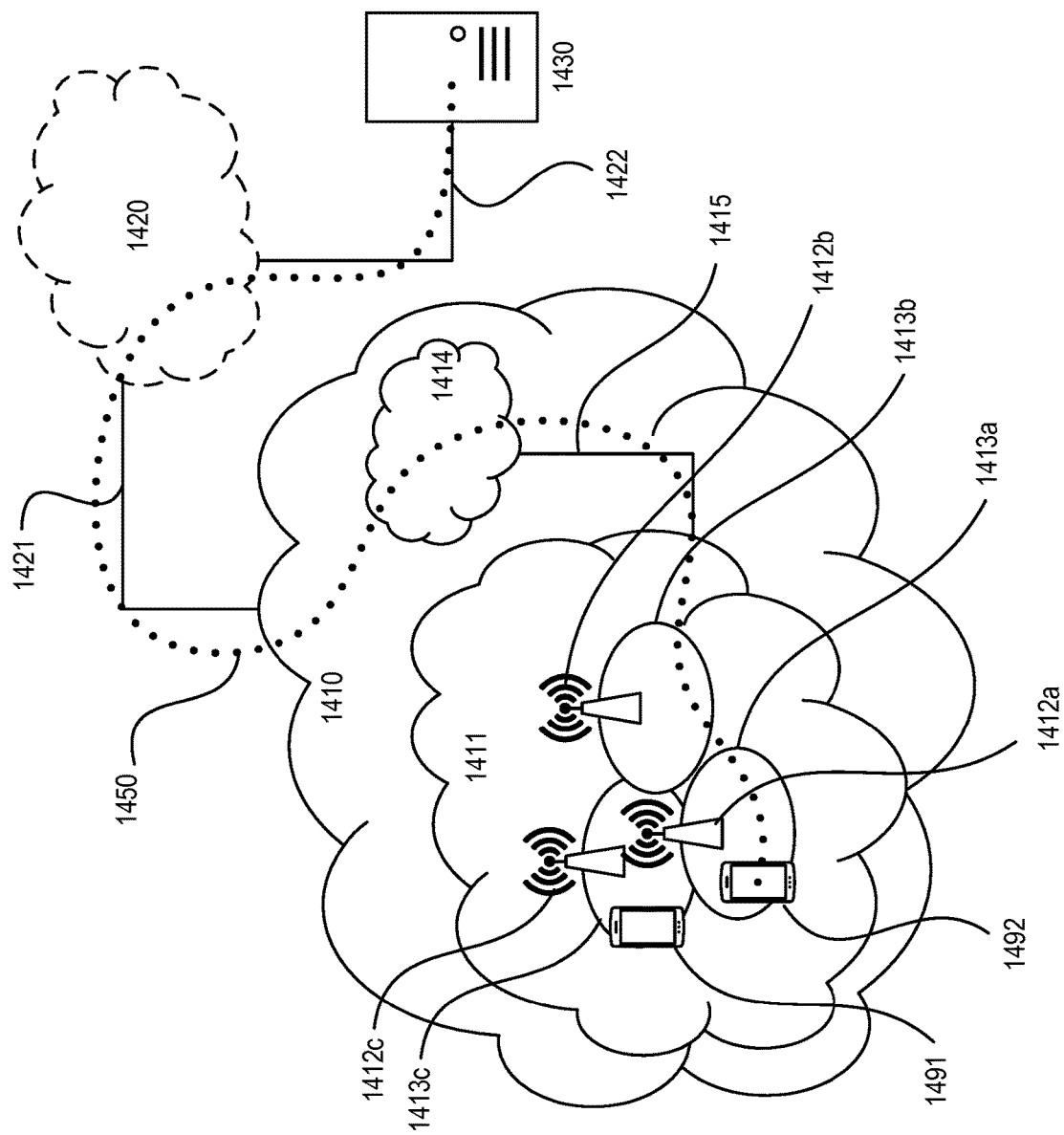
FIG. 16 is a schematic illustrating an example telecommunication network, according to particular embodiments of the present disclosure.

FIG. 16 illustrates a telecommunication network connected via an intermediate network to a host computer in accordance with some embodiments. In particular, with reference to FIG. 16, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 16 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 17:
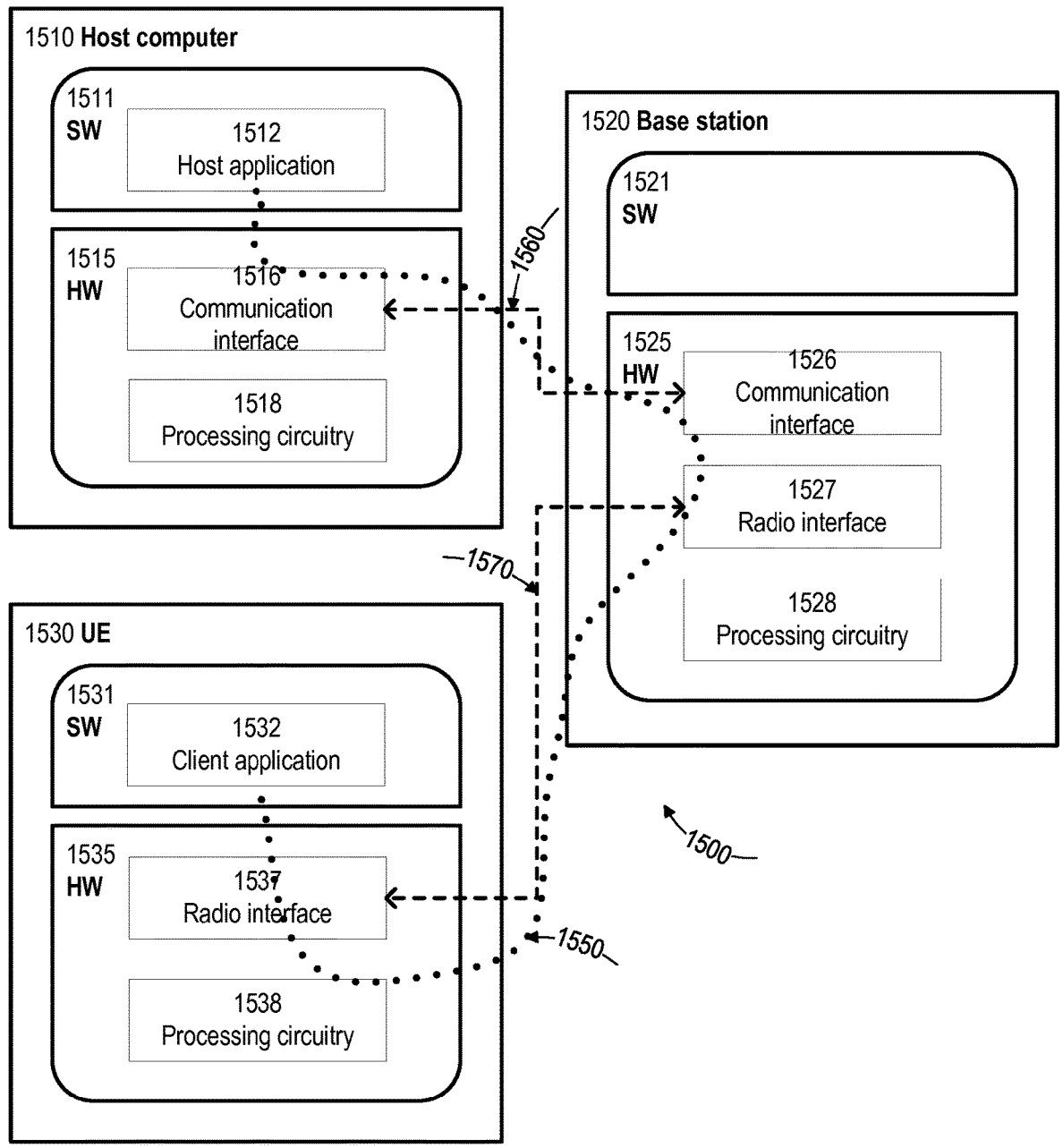
FIG. 17 is a schematic block diagram illustrating an example communication system, according to particular embodiments of the present disclosure.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 17) served by base station 1520. Communication interface 1526 may be configured to facilitate connection 1560 to host computer 1510. Connection 1560 may be direct or it may pass through a core network (not shown in FIG. 17) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 17 may be similar or identical to host computer 1430, one of base stations 1412a, 1412b, 1412c and one of UEs 1491, 1492 of FIG. 16, respectively. This is to say, the inner workings of these entities may be as shown in FIG. 17 and independently, the surrounding network topology may be that of FIG. 16.

In FIG. 17, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve UE power consumption and thereby provide benefits such as reduced interference and longer battery life.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 18:
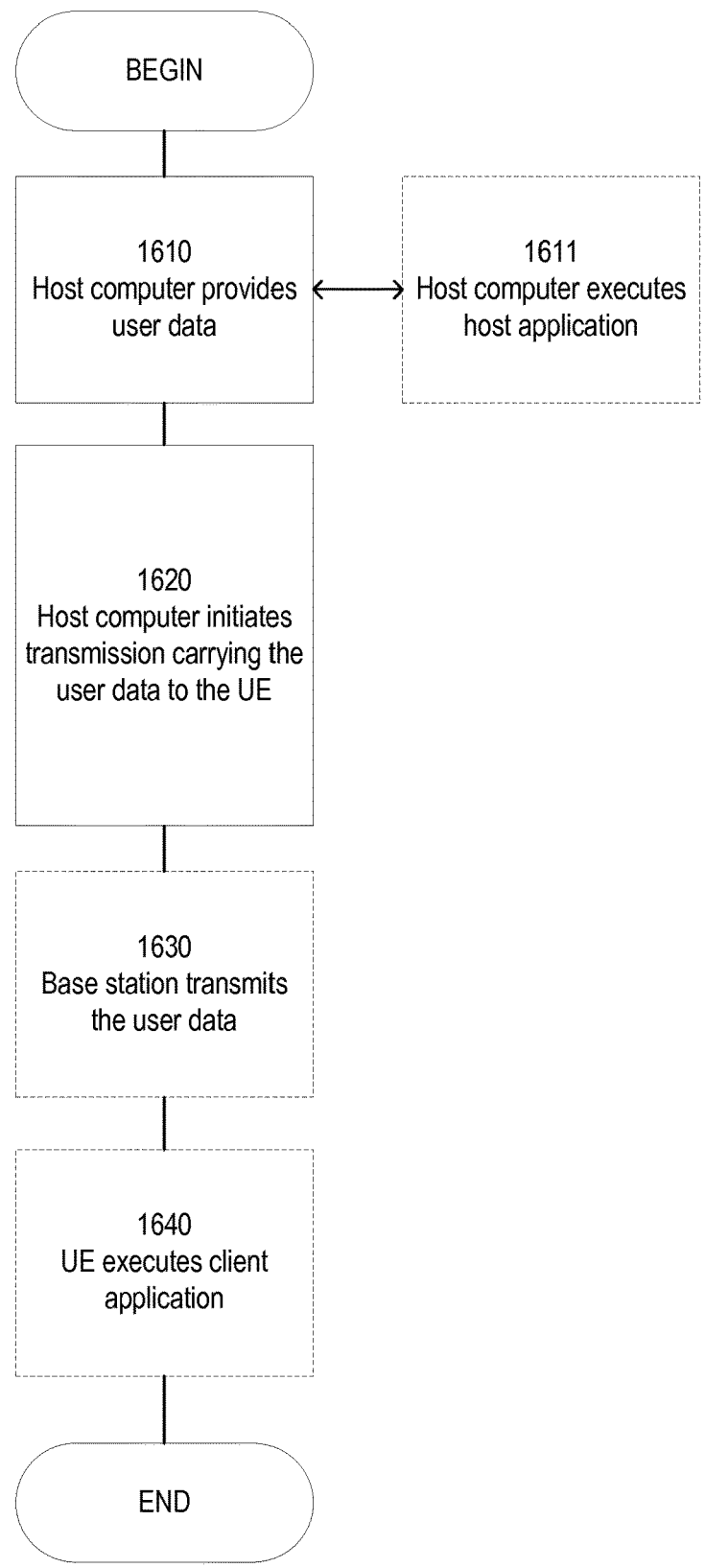
FIGS. 18-21 are flow diagrams, each of which illustrates an example method implemented in a communication system, according to particular embodiments of the present disclosure.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 19:
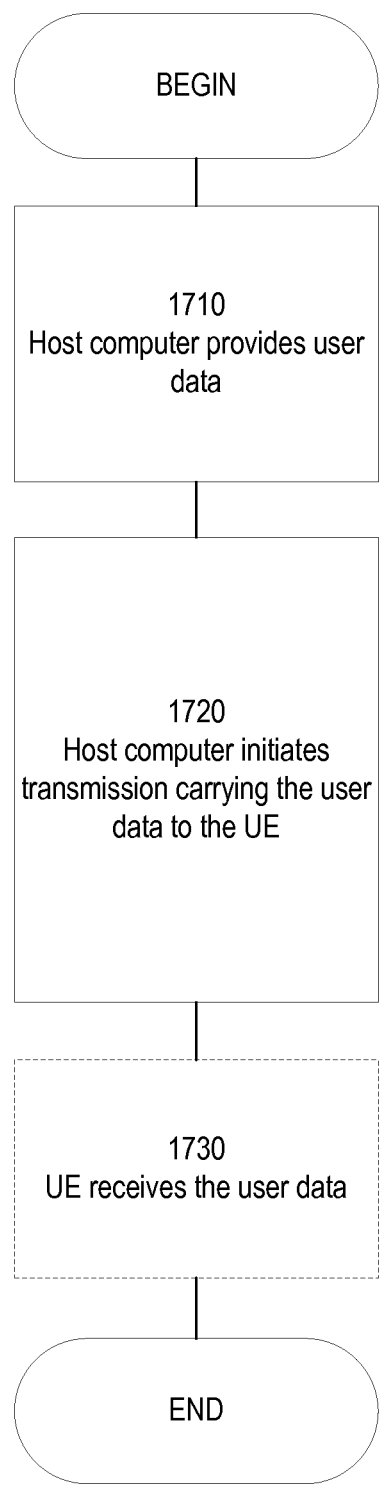

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 20:
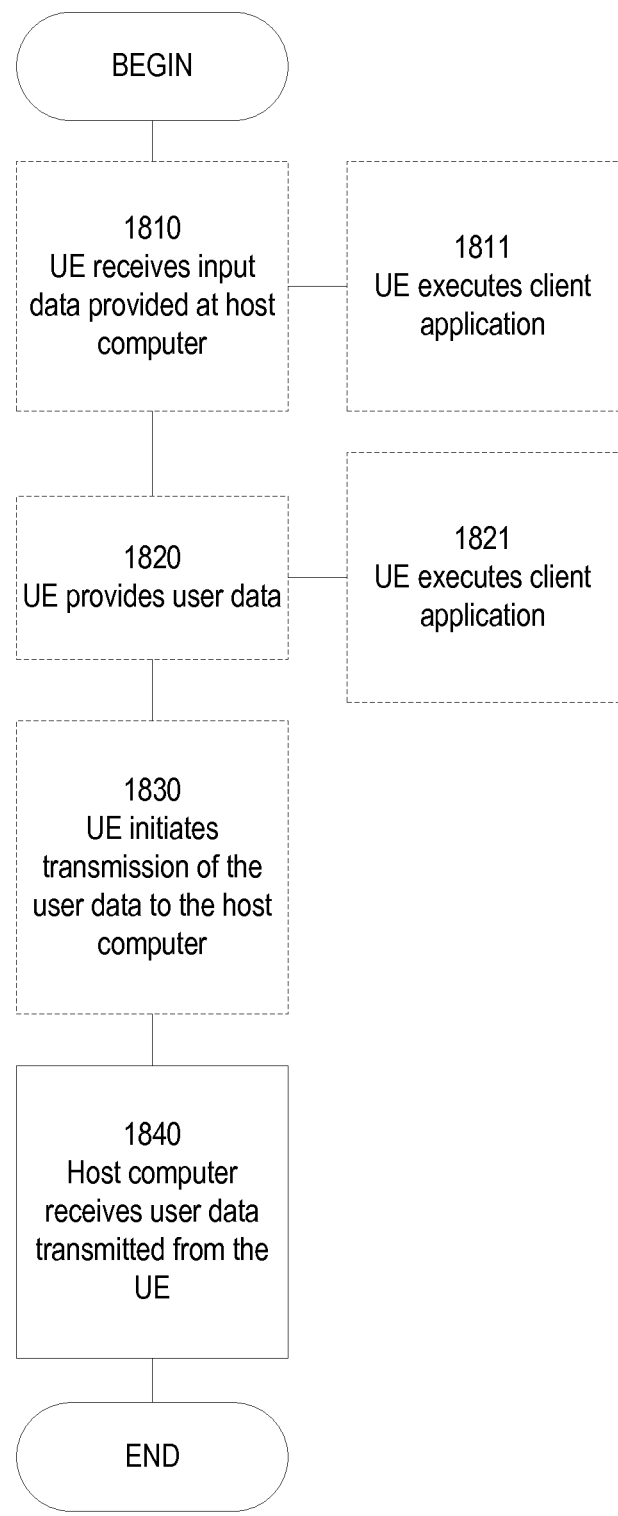

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 21:
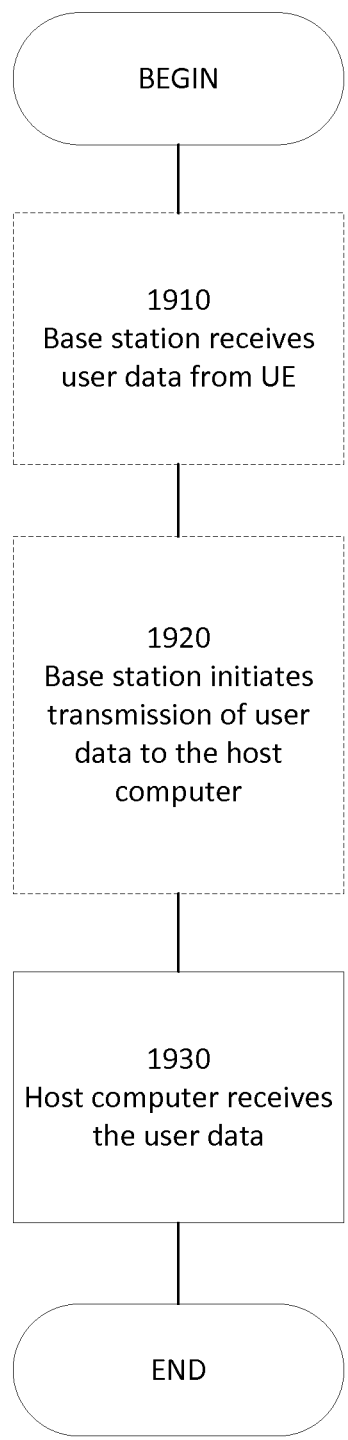

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Additional information may be found in Appendix A, which is incorporated in its entirety by reference.

What is claimed is:

1. A method implemented by a user equipment (UE) in a serving cell of the wireless communication network, the method comprising the UE:

receiving configuration information from a base station or network node for configuring discontinuous reception (DRX) by the UE;
receiving downlink control information from the base station via Layer1 signaling scheduling a data transmission, the downlink control information including an indication to the UE to:
go to sleep at the end of the scheduled transmission;
change the IAT at the end of the scheduled data transmission; or
change the power saving settings at the end of the scheduled data transmission; and
controlling or adapting DRX by the UE responsive to the downlink control information from the base station.

2. The method of claim 1, wherein the configuration information comprises a setting for an inactivity timer of the UE.

3. The method of claim 2, wherein the downlink control information comprises an indication to adjust or override the DRX setting for the inactivity timer, and wherein the method further comprises adjusting or overriding the DRX setting for the inactivity timer responsive to the indication.

4. The method of claim 3, wherein the downlink control information comprises an indication to set the inactivity timer to a predetermined value, and wherein the method further comprises setting the inactivity timer according to the predetermined value.

5. The method of claim 3, wherein the downlink control information comprises an indication to set the inactivity timer to 0, and wherein the method further comprises setting the inactivity timer to 0 responsive to the indication.

6. The method of claim 2, wherein the downlink control information is received in a downlink control message scheduling a data transmission to the UE on a downlink shared channel.

7. The method of claim 6, further comprising:
decoding the scheduled data transmission; and
controlling or adjusting the inactivity timer based on the downlink control information and an Automatic Repeat Request (HARQ) response associated with the scheduled data transmission indicating an outcome of the decoding.

8. The method of claim 7, wherein controlling or adjusting the inactivity timer comprises applying the setting for the inactivity timer following reception of the scheduled data transmission on the downlink shared channel, when the downlink control information has a first value.

9. The method of claim 7, wherein controlling or adjusting the inactivity timer comprises adjusting or overriding the setting for the inactivity timer following reception of the scheduled data transmission on the downlink shared channel, when the downlink control information has a second value and the HARQ response comprises an ACK.

10. The method of claim 7, wherein controlling or adjusting the inactivity timer comprises applying the setting for the inactivity timer following reception of the scheduled data transmission on the downlink shared channel, when the downlink control information has a second value and the HARQ response comprises a NACK.

11. A method implemented by a base station in wireless communication network, the method comprising the base station:
sending configuration information to a user equipment (UE) to configure discontinuous reception (DRX) by the UE; and
sending downlink control information to the UE via Layer 1 signaling scheduling a data transmission, the downlink control information including an indication to the UE to:
go to sleep at the end of the scheduled transmission;
change the IAT at the end of the scheduled data transmission; or
change the power saving settings at the end of the scheduled data transmission.

12. The method of claim 11, wherein the configuration information comprises a DRX setting for an inactivity timer of the UE.

13. The method of claim 12, wherein the downlink control information comprises an indication to adjust or override the DRX setting for the inactivity timer.

14. The method of claim 13, wherein the downlink control information comprises an indication to set the inactivity timer to a predetermined value or to set the inactivity timer to 0.

15. The method of claim 12, wherein the downlink control information is transmitted in a downlink control message scheduling a data transmission to the UE on a downlink shared channel.

16. The method of claim 15, wherein the downlink control information comprises an indication to apply the DRX setting for the inactivity timer following reception of the scheduled data transmission on the downlink shared channel.

17. The method of claim 16, wherein the downlink control information comprises an indication to apply the DRX setting for the inactivity timer depending on a Hybrid Automatic Repeat Request (HARQ) indication associated with the scheduled data transmission.

18. The method of claim 15, wherein the downlink control information comprises an indication to adjust or override the DRX setting for the inactivity timer following reception of the scheduled data transmission on the downlink shared channel.

19. A user equipment in a wireless communication network, the user equipment comprising, the user equipment comprising:
an interface circuit configured for communication with one or more serving cells the wireless communication network; and
processing circuitry configured to:
receive first configuration information from a base station or network node for configuring discontinuous reception (DRX) by the UE;
receive downlink control information from the base station via Layer1 signaling scheduling a data transmission, the downlink control information including an indication to the UE to:
go to sleep at the end of the scheduled transmission;
change the IAT at the end of the scheduled data transmission; or
change the power saving settings at the end of the scheduled data transmission; and
control or adapt DRX by the UE responsive to the downlink control information from the base station.

20. A base station in a serving cell of the wireless communication network, the base station comprising:
an interface circuit configured for communication with one or more serving cells the wireless communication network; and processing circuitry configured to:
   send first configuration information to a user equipment (UE) to configure discontinuous reception (DRX) by the UE; and
   send downlink control information to the UE via Layer1 signaling scheduling a data transmission, the downlink control information including an indication to the UE to:
   go to sleep at the end of the scheduled transmission;
   change the IAT at the end of the scheduled data transmission; or
   change the power saving settings at the end of the scheduled data transmission.

* * * * *